United States Patent [19]
Ikegaya et al.

[11] Patent Number: 6,148,305
[45] Date of Patent: Nov. 14, 2000

[54] DATA PROCESSING METHOD FOR USE WITH A COUPLING FACILITY

[75] Inventors: Naoko Ikegaya, Sagamihara; Hiroshi Yamada, Yokohama; Masaichiro Yoshioka, Sagamihara, all of Japan

[73] Assignee: Hitachi, Ltd., Tokyo, Japan

[21] Appl. No.: 09/018,312

[22] Filed: Feb. 3, 1998

[30] Foreign Application Priority Data

Feb. 6, 1997 [JP] Japan .................................. 9-038336

[51] Int. Cl.⁷ ............................................ G06F 17/30
[52] U.S. Cl. ....................... 707/104; 707/10; 707/201; 709/201; 709/213
[58] Field of Search ................................ 707/10, 1, 2, 8, 707/200, 201, 238, 4, 104; 709/201, 217, 213

[56] References Cited

U.S. PATENT DOCUMENTS

| | | | |
|---|---|---|---|
| 5,564,019 | 10/1996 | Beausoleil et al. | 395/200.08 |
| 5,721,914 | 2/1998 | DeVries | 707/104 |
| 5,812,843 | 9/1998 | Yamazaki et al. | 709/201 |
| 5,864,679 | 1/1999 | Kanai et al. | 395/200.68 |

*Primary Examiner*—John Breene
*Assistant Examiner*—Greta Robinson
*Attorney, Agent, or Firm*—Antonelli, Terry, Stout & Kraus, LLP

[57] ABSTRACT

In a data processing method of a coupling facility connected to a plurality of computer or processing nodes which access files of different formats to share files therebetween, it is possible to minimize overhead of the format conversion between files. Stored in the coupling facility is a channel information table including information of formats of files to be accessed by computers. A processing node updates a file and sends an update file resultant from the update to the coupling facility. On receiving the update file, the coupling facility refers to the table to convert the file into files of the formats related to the processing nodes sharing the file and stores the converted files in a file cache. Receiving a request from a processing node for latest data of the shared file, the coupling facility selects one of the converted update files related to the requesting node and sends the selected file thereto.

4 Claims, 6 Drawing Sheets

DATA PROCESSING METHOD FOR USE WITH A COUPLING FACILITY

BACKGROUND OF THE INVENTION

1. Field of the Invention

The present invention relates to a data processing method for use with a coupling facility, and in particular, to a data processing method for use with a coupling facility which couples with each other, a plurality of processing or computer nodes accessing files of mutually different formats.

2. Description of the Related Art

In accordance with U.S. Pat. No. 5,561,809 and U.S. Pat. No. 5,388,266, there has been described a computer system in which a coupling facility is linked via an optical link with computer or processing nodes such that the processing nodes communicate with each other via the coupling facility.

In this manner, the coupling facility is connected to a plurality of processing nodes so that each node can communicate data, via the coupling facility, with another node.

The coupling facility includes a memory having a memory area to be shared among the respective processing nodes.

On the other hand, each node includes a message facility to mutually conduct communication with the coupling facility such that the node communicates data and messages with the coupling facility.

When data shared between the processing nodes is updated in the coupling facility, the coupling facility notifies the processing nodes sharing the data of the data update.

Receiving the notification, the node possibly discards old data in order to read new data thus updated from the coupling facility.

Moreover, in accordance with JP-A-4--369058, there has been described a text file transfer method which facilitates transfer of text files between computers using different kinds of character data.

In the text file transfer method, a computer as a transfer source of a text file determines a kind of character data used by a partner computer as a transfer destination and converts the text file into a file of the pertinent kind of character data to thereby send the converted file to the partner computer.

Additionally, when a text file is received from the partner, the computer converts the file into a file of the kind of character data thereof.

As described above, the processing nodes are connected to the coupling facility such that when data is updated in the coupling facility, the update of data is notified to the processing nodes. Consequently, there can be retained coherency of data shared between the processing nodes.

However, U.S. Pat. No. 5,561,806 and U.S. Pat. No. 5,388,266 assume that the file formats of the respective computers are substantially identical to each other. Moreover, in JP-A-4-369058 disclosing the conversion of kinds of character data in the computers as the transfer source and destination, there is missing description of the file sharing operation in a computer system in which a plurality of computers using mutually different file formats are connected to the coupling facility.

Consequently, there exists a problem of improvement of efficient usage of data shared between the computers which are connected to the coupling facility and which are using mutually different file formats.

SUMMARY OF THE INVENTION

It is therefore an object of the present invention to provide a data processing method in which computer or processing nodes handling data items of mutually different file formats can efficiently share data therebetween via a coupling facility.

To achieve the object set forth above in accordance with the present invention, the coupling facility keeps therein a correspondence relationship between each computer and a format of a file to be accessed by the computer. When a first computer issues a request to update data in a shared file kept in the coupling facility, the shared file of the coupling facility is updated in accordance with data sent from the first computer and then the update of file is notified to the computers using the shared file. Thereafter, if a second computer having received the notification issues a request to read the file, a format of a file to be accessed by the second computer is compared with that of the shared file kept in the coupling facility in accordance with the correspondence relationship. When the formats differ from each other, data of the shared file is converted into data according to the file format of the second computer and then the converted data is sent to the second computer. When the formats are equal to each other, the data of the shared file is transmitted to the second computer without conversion thereof.

In addition, the converted data is additionally stored in the shared file of the coupling facility such that when a third computer using the file format of the converted data issues a request to read data from the shared file, the converted data added thereto as above is delivered to the third computer.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Description will now be given in detail of an embodiment in accordance with the present invention.

Figure 1:
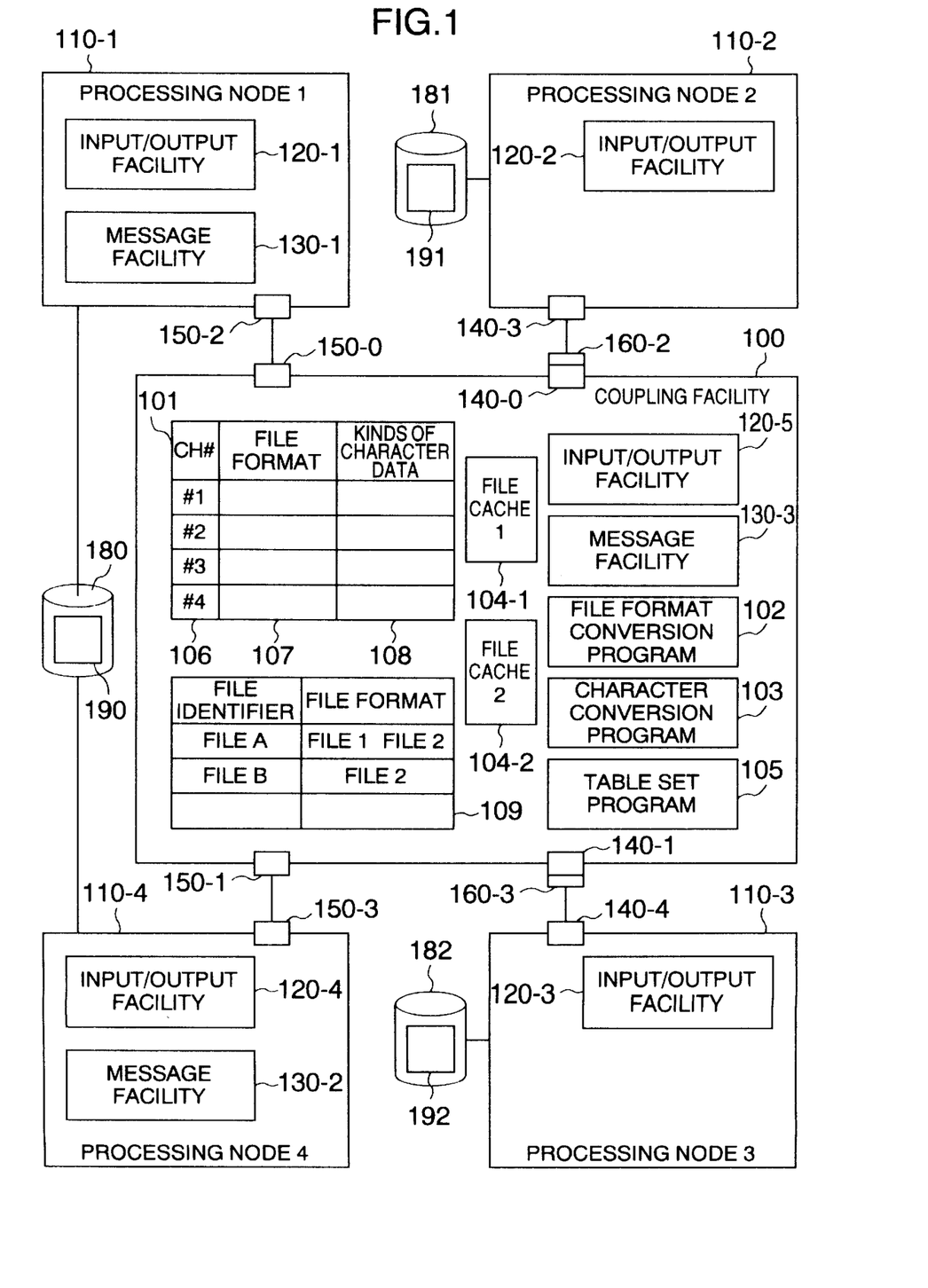
FIG. 1 is a schematic diagram showing the configuration of a computer system in accordance with the present invention.

FIG. 1 shows the constitution of a computer system as a premise of the embodiment.

The configuration of FIG. 1 includes coupling faciliy 100 and computer or processing nodes 110-$i$ ($i$=1, 2, 3, 4).

The coupling facility 100 includes an input/output facility 120-5, a message facility 130-3, a channel information table 101, a file format storage table 109, a file format conversion program 102, a character code or data conversion program 103, a format 1 file cache 104-1, a format 2 file cache 104-2, a table set program 105, channels 140-0 and 140-1, and message channels 150-0 and 150-1.

Stored in the file format storage table 109 are formats of shared files kept in the coupling facility 100.

When update data of a shared file is read from the processing node 110 to be stored in the file cache 104 of the coupling facility 100 or when a shared file in one of the file cache memories 104 is stored by converting the format thereof in the other one of the file cache memories 104, a correspondence is established between an identifier of the shared file and the format to be registered to the file format storage table 109.

As a result of to this provision, when the processing node 110 reads a shared file from the coupling facility 100, it can be determined by use of the file format storage table 109 whether or not the coupling facility 100 keeps a file of a format which can be accessed by the node 110.

The processing node 110-1 includes an input/output facility 120-1 and a message facility 130-1 and uses a file 190 of format 1 in a shared fashion, the file 190 being stored in a disk device 180. Similarly, the processing node 110-4 uses a file 190 of format 1 in a shared manner.

Additionally, a message channel 150-2 is connected to the message channel 150-0 of the coupling facility 100 to communicate messages with a message facility 130-1 via a message facility 130-3 of the coupling facility 100. Similarly, a message channel 150-3 communicates with the message facility 130-3.

The processing node 110-2 includes an input/ output facility 120-2 to use a file 191 of format 2 stored in a disk device 181. This is also the case with the processing node 110-3.

In this regard, the disk device 181 may be connected via a small computer system interface (SCSI) to the processing nodes 110.

Furthermore, the channel 140-3 is connected to the channel 140-0 of the coupling facility 100 to achieve communication via a channel coupling facility 160-2 or the channel 140-4 is connected to the channel 140-1 of the coupling facility 100 to carry out communication via a channel coupling facility 160-3.

The channel information table 101 is utilized to establish a correspondence between a channel number and a file format and a kind of character data of a processing node as a connecting destination of a channel associated with the channel number.

The table 101 includes entries each including a field 106 to store a channel number, a field 107 to store a file format to be used by a processing node 110 connected via a channel corresponding to the channel number, and a field 108 to store a kind of character data.

Figure 5:
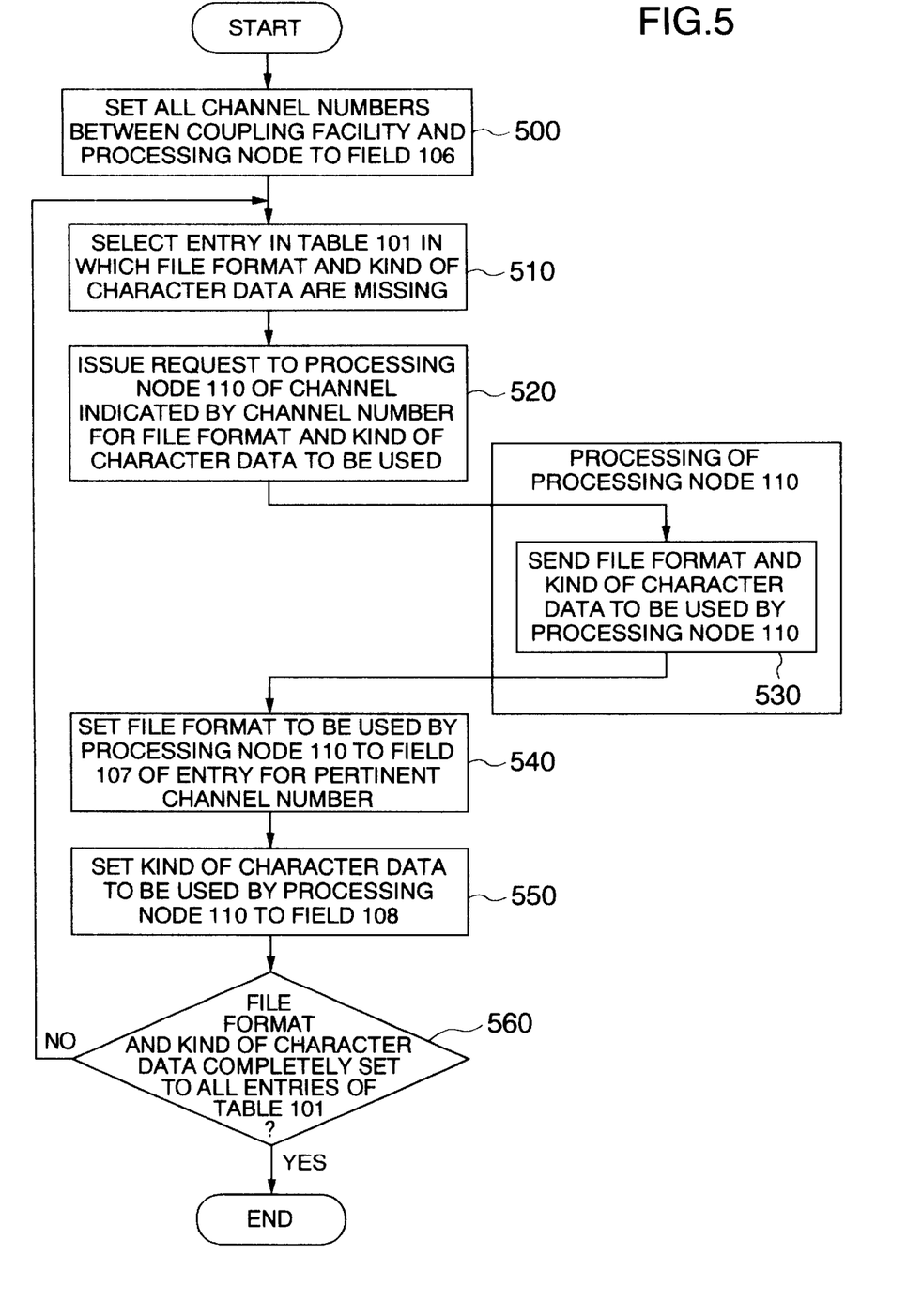
FIG. 5 is a flowchart of processing to set values to fields of a channel information table in accordance with the present invention.

Referring now to the flowchart of FIG. 5, description will be given of processing to set values to these fields of the channel information table 101.

During an initial setup stage of the coupling facility 100, the table set program 105 is activated.

The program 105 first sets all channel numbers of the channels 150-0, 150-1, 140-0, and 140-1 connected to the processing node 110 to the field 106 of the table 101 (Step 500).

Next, the program 105 selects from the table 101 an entry to which only a channel number has been set (step 510).

The program 105 then sends a message requesting a file format and a kind of character data of a file to be accessed to a channel indicated by the channel number in the field 106 of the selected entry (step 520).

For channels other than the message channels 150-0 and 150-1, the program 105 inserts a request message into data of an input/output instruction. On receiving the message, the processing node 110 sends information of the file format and the kind of character data of the file to be accessed to the coupling facility 100 (step 530).

Thereafter, the coupling facility 110 sets the information of the file format received from the node 110 to the field 107 of the entry selected in step 510 (step 540) and sets the information of the kind of character data to the field 108 thereof (step 550).

Finally, a check is made to determine whether or not the respective information items of the file format and the kind of character data have already been set to all entries of the table 101 associated with the channel of the coupling facility 100 (step 560). If this is the case, the processing is terminated.

On the other hand, if there exists any entry not yet set in the table 101, control is returned to step 510 to repeatedly execute the processing described above.

As a result, the coupling facility 100 can establish a correspondence between identifier information of the channel 140 or 150 and the file format of the file and the kind of character code of text data which can be used by the processing node 110 connected to the coupling facility 100.

Incidentally, it may also be possible that one processing node, for example, the node 110-2 controls all processing nodes and channels as well as the file formats and kinds of character data used by the respective processing nodes such that the table set program 105 sends a message only to the particular node 110-2 to request information of the processing nodes and channels and information items of the file formats and kinds of character data used by the respective nodes.

Subsequently, the file formats will be described by referring to FIGS. 2A to 2C.

Assume that the files are in a count key data format or in a fixed block format.

Figure 2A:
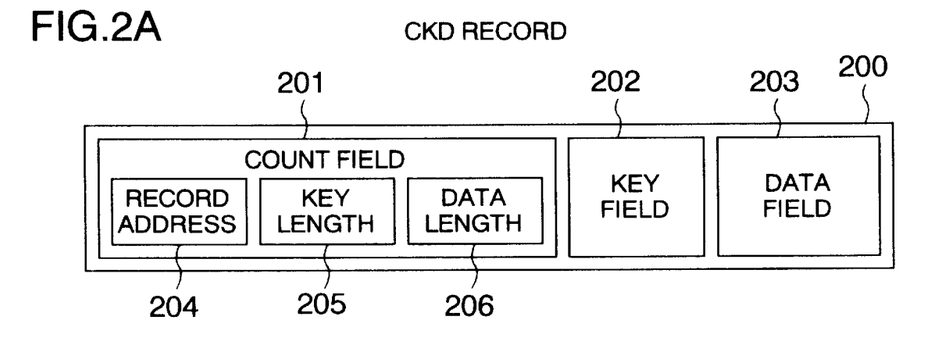
FIGS. 2A to 2C are diagrams showing a file format of an embodiment in accordance with the present invention.

In the description below, a record of the CKD format shown in FIG. 2A is called a CKD record.

Moreover, a record of the FB format is referred to as an FB record.

The CKD record includes a count field 201, a key field 202, and a data field 203.

Additionally, the count field includes a field 204 to store an record address including a combination of a cylinder number, a head number, and a relative address of the disk device 180, a field 205 to store a length of the key field 202, and a field 206 to store a length of the data field 203.

Figure 2B:
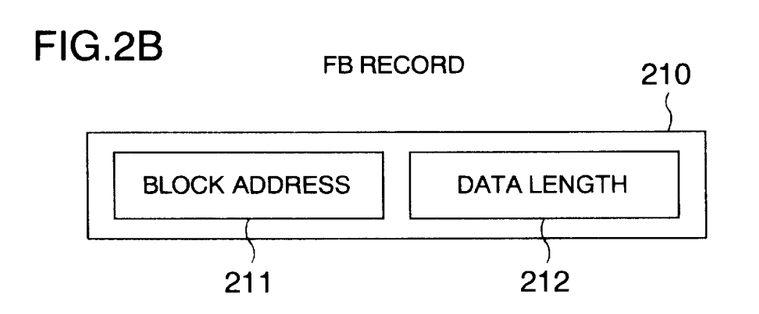
Figure 2C:
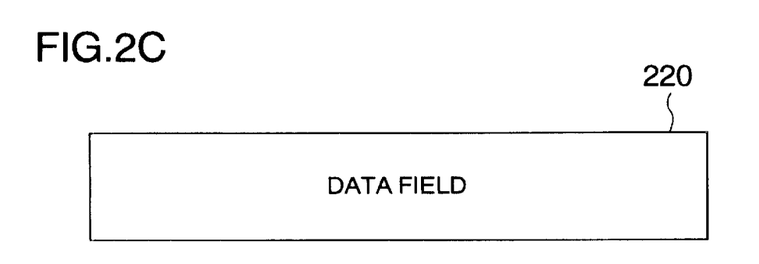

The FB records are classified into index records 210 of FIG. 2B and data records 220 of FIG. 2C.

Furthermore, the index record 210 includes a field 211 to store a block address of the data record 220 and a field 212 to store a size of the file.

Figure 3:
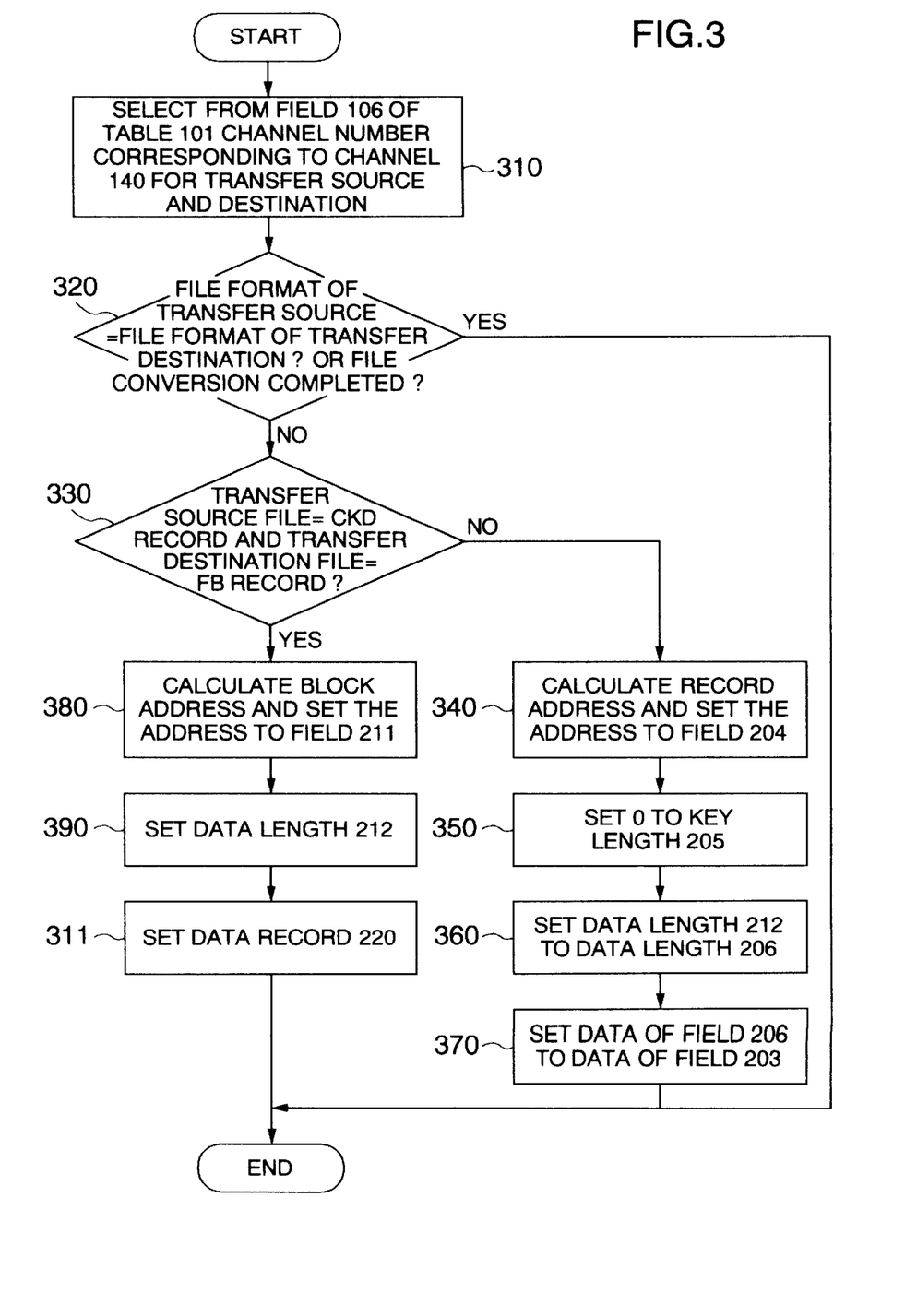
FIG. 3 is a flowchart of processing of a program of a coupling facility to convert a file format in an embodiment in accordance with the present invention.

Referring now to the flowchart of FIG. 3, description will be given of processing of the program 102 of the coupling facility 100 to convert the file format.

In an operation to transfer a file between the processing nodes 110, the file format conversion program 102 accesses the field 106 of the channel information table 101 to obtain therefrom a channel number corresponding to the channel 140 to connect the processing nodes (step 310).

The program 102 compares the field 107 of an entry related to the field 106 corresponding to the channel number of the transfer source with that of an entry related to the field 106 corresponding to the channel number of the transfer destination (step 320). If the file format information items are equal to each other or if the file format has already been converted, the program 102 terminates its processing of conversion.

On the other hand, if the file format information items are different from each other, the program 102 checks for each of the transfer source and destination the file format information set to the field 107 (step 330).

That is, when the file format of the destination indicates a CKD record and that of the source denotes an FB record, the program 102 converts the FB record into a CKD record. Under a reverse condition, the program 102 converts the CKD record into an FB record.

In the conversion from the FB record into a CKD record 200, the program 102 obtains a value 204 of the record address of the count field 201 in accordance with the block address in the field 211 of the index record 210 and sets the value to the pertinent field (step 340).

The address value 204 is calculated as follows.

Cylinder no.=(block address×block length)/cylinder capacity;

Head no.={remainder of ((block address×block length)/cylinder capacity)}/track capacity;

Byte position relative to start position of track=remainder of ((block address×block length)/track capacity);

Next, the program 102 sets 0 to the value 205 of the key length of the count field 201 (step 350), sets the block length value 212 to the data length value 206 (step 360), stores the resultant data record 220 items in the data field 203 (step 370), and then terminates the conversion of the FB record into the CKD record 200.

On the other hand, when converting the CKD record 200 into an FB record, the program 102 obtains a block address of the field 211 of the index record 210 in accordance with the record address value 204 of the count field 201 and sets the value to the pertinent field (step 380).

The block address value is calculated as follows.

Block address=(cylinder no.×cylinder capacity+head no.× track capacity)/block length.

Subsequently, the program 102 sets the value of data length 206 to the block length field 212 (step 390), sets the data field 203 to the objective record (step 311), and then terminates the conversion of the CKD record 200 into the FB record.

Figure 6:
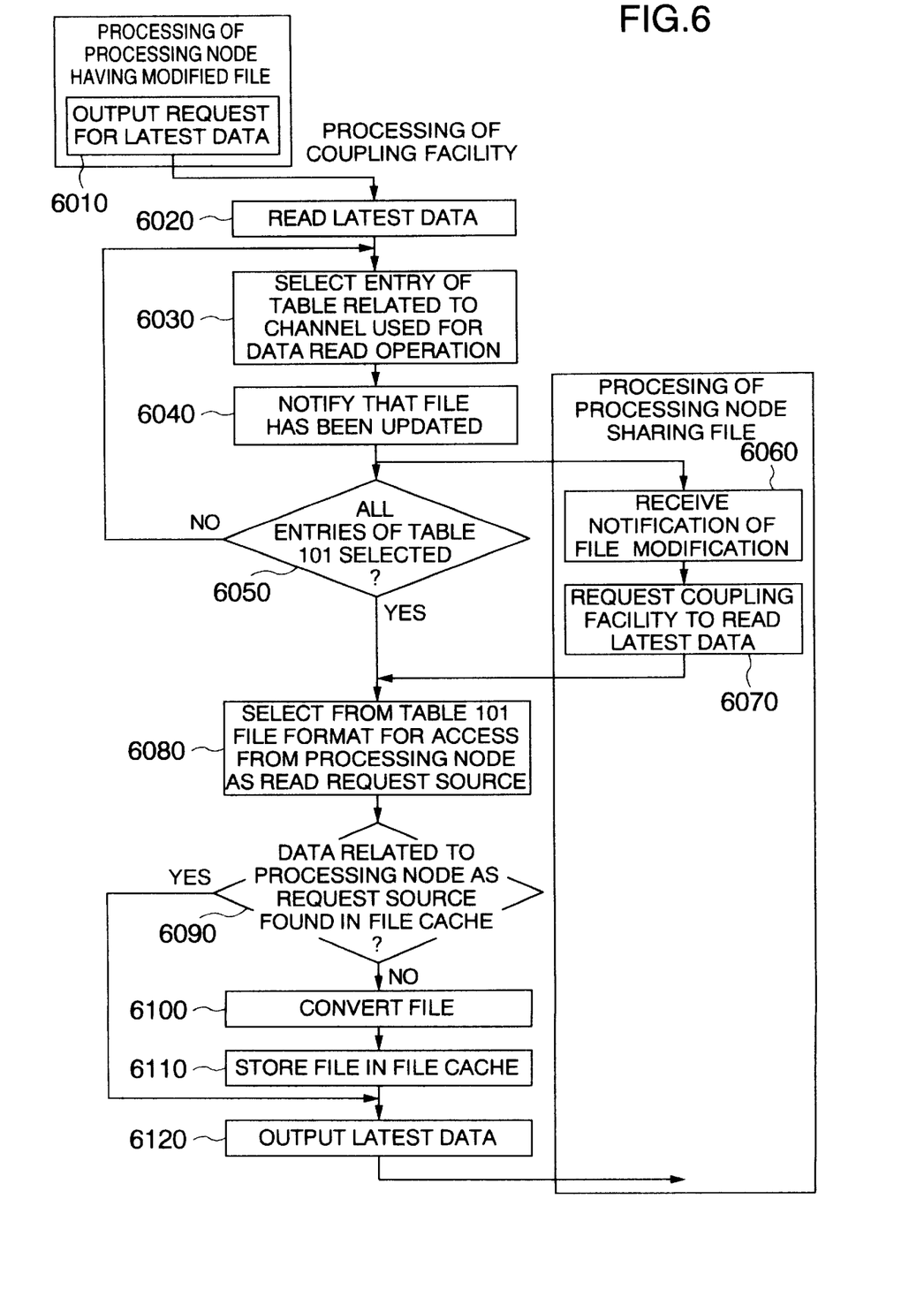
FIG. 6 is a flowchart of processing in which when one of the processing nodes updates a file, the update file is sent to all processing nodes using the file in accordance with the present invention.

Referring now to the flowchart of FIG. 6, description will be given of processing in which one of the processing nodes 110 modifies a file and then sends latest data to all processing nodes 110 using the file in a shared manner.

Assume that the contents of files 190 to 192 are the same as each other and four processing nodes 110 share these files.

Having modified the file 191, the node 110-2 issues a request via the channel coupling facility 160-2 to the coupling facility 100 to output the latest data (step 6010).

Incidentally, in accordance with the embodiment, data communicated via the channel 140-0 or 140-1 is inputted to or outputted from the file cache 2 (104-2); whereas, data transferred via the channel 150-0 or 150-1 is inputted to or outputted from the file cache 1 (104-1).

Receiving the request from the node 110-2, the coupling facility 100 stores the latest data in the file cache 140-2, invalidates provisionally the file format corresponding to the identifier of the file 191 in the file format storage table 109, and registers the identifier of the file 191 and format 2 to the table 109 with a correspondence established therebetween (step 6020).

Next, the coupling facility 100 obtains a channel of a processing node other than the node 110-2 from the channel information table 101 (step 6030) and then notifies the modification of data of file 191 onto the selected channel (step 6040).

The facility 100 checks to determine whether or not there still exists a node 110 to which the file modification is to be notified (step 6050). If there exists such a node 110, control is returned to step 6030 to repeatedly execute the processing above.

On receiving the file modification message via the channel 140 or the message channel 150 from the coupling facility 100 (step 6060), the node 110 issues a file input request to the channel 140 or 150 of the coupling facility 100 if the node 110 requires the updated file (step 6070).

Receiving the request, the coupling facility 100 selects a file format for the node 110 from the field 107 according to the channel number of the channel information table 101 (step 6080) and then determines in accordance with the file format storage table 109 whether or not a file of the selected format is found in the file cache 104 (step 6090).

Since the processing node 110-3 can access a file of format 2, the latest data stored in the cache 104-2 from the node 110-2 need only be outputted thereto without any modification (step 6120).

When latest data of a format which can be used by the node 110-1 is missing in the cache 104-1, the file format conversion program 102 converts the format of the file (step 6100) to store the converted file in the caches 104-1. The identifier of file 191 and format 1 are registered to the file format storage table 109 with a correspondence established therebetween (step 6110) and then control is passed to step 6120.

When the node 110-4 issues a request to read the update file after the node 110-1, since it can be recognized by checking the table 109 that the update file converted according to format 1 is already stored in the cache 104-1, the file conversion is unnecessary when outputting the latest data to the node 110-4.

As set forth above, the latest data of file can be transferred at a high speed from the coupling facility 100 to a plurality of processing nodes 110 accessing files in mutually different file formats.

In this connection, there may be considered a method in which steps 6090 to 6110 are arranged immediately after step 6030 such that the file conversion is accomplished without awaiting the input request of the latest data from the node 110.

Figure 4:
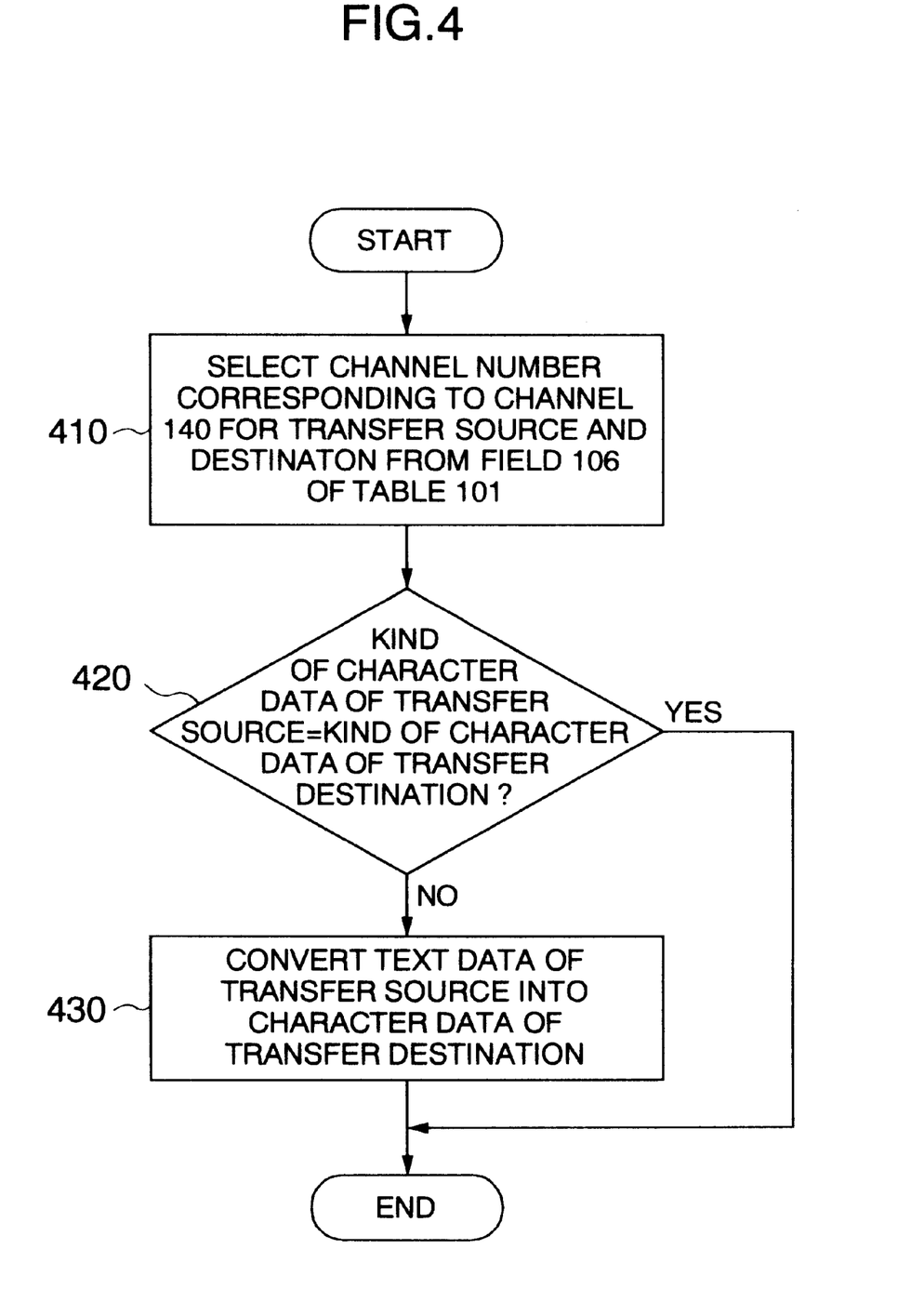
FIG. 4 is a flowchart of processing of a program of a coupling facility to convert a character code or data format in an embodiment in accordance with the present invention.

Next, referring to the flowchart of FIG. 4, description will be given of processing of the program 103 of the coupling facility 100 to convert the kind of character code of text data.

When text data is to be transmitted from the node 110-1 to the node 110-3, the character code conversion program 103 selects entries respectively of the channels 150-1 and 140-1 from the field 106 of the channel information table 101 (step 410).

Comparing the field 108 of the entry of channel 150-1 with that of the entry of channel 140-1, the program 103 terminates its processing if the information items of the respective kinds of character codes are identical to each other.

On the other hand, when the kinds of character codes are different from each other, the program 103 converts the character codes of text data in accordance with the information of kind of character code in the entry of channel 140-1 (step 430).

For example, assume that there is achieved a text data conversion when the processing nodes 110-1 and 110-4 use an 8-bit character code system, specifically, the extended binary coded decimal interchange code (EBCDIC) system and processing nodes 110-2 and 110-3 utilize a 7-bit character code system, specifically, the American standard code for information interchange (ASCII) system.

For this conversion, there are used two code conversion tables representing correspondences of 256 kinds of character codes for the conversions from EBCDIC to ASCII and vice versa.

For example, a hexadecimal code for letter C is represented as C3 in EBCDIC and 43 in ASCII.

In this case, described in the conversion tables are character codes of EBCDIC and ASCII with the correspondences therebetween such that C3 is converted into 43 in the conversion from EBCDIC to ASCII and 43 is transformed into C3 in the conversion from ASCII to EBCDIC.

Under this condition, eight or seven bits are obtained from the text data for each operation of conversion. For the 8-bit or 7-bit data, a character code corresponding thereto is obtained from the pertinent code table to substitute the obtained code for the original code.

Through the operation above, the program 103 of the coupling facility 100 conducts a character conversion between different kinds of character code of text data.

In accordance with the embodiment described above, when files are shared between processing nodes accessing files of different file formats, it is possible to minimize overhead in the file format conversion between files.

As described above, there is provided a data processing method in accordance with the present invention in which processing nodes having data items of mutually different file formats share data items via a coupling facility and the coupling facility converts data items according to a plurality of file formats and stores the converted data items therein. In response to a data request from a processing node, the coupling facility selects data of a file format associated with the processing node to thereby transfer the data to the processing node.

Particularly, when n processing nodes using files of format 1 and m processing nodes utilizing files of format 2 share files, if a processing node having modified a file sends the update file to the coupling facility, the coupling facility once conducts the format conversion of data between format 1 and format 2 to deliver the update file to n+m−1 processing nodes, which minimizes overhead of the form conversion in the data processing system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A data processing method for use with a coupling facility, said method comprising the steps of:

keeping a correspondence relationship between each of a plurality of computers and a format of an address expression used to locate data of a file to be accessed by one of said plurality of computers;

updating the shared file in response to a request from a first computer selected from said plurality of computers to update a shared file kept in said coupling facility which is connected to said plurality of computers, and holding a format of an address expression for the first computer in accordance with data sent from the first computer;

notifying from said coupling facility the update of the shared file to computers using the shared file;

comparing, in response to a request from a second computer selected from said plurality of computers notified of the update of the shared file, a format of an address expression for the second computer with a format of an address expression of the shared file kept in said coupling facility in accordance with the correspondence relationship;

converting, when the formats are different from each other as a result of said comparing step, the address expression of the shared file into the address expression for the second computer and transmitting the data with the converted address expression to the second computer; and sending, when the formats are equal to each other as a result of the comparison, data of the shared file to the second computer.

2. A data processing method in accordance with claim 1, further comprising the steps of:

storing, when the formats are different from each other as a result of the comparison, the converted address expression of the shared file additionally in the coupling facility;

transmitting, in response to a request issued to read the shared file from a third computer which is selected from said plurality of computers and which uses a file format equal to that of the second computer, the converted address expression thus additionally added in the coupling facility to the third computer.

3. A data processing method in accordance with claim 1, wherein the correspondence relationship includes for each channel of the coupling facility, a set of information of an identifier of the channel and a file format of one of said plurality of computers connected to the channel.

4. A data processing method for use with a coupling facility, said method comprising the steps of:

keeping a correspondence relationship between each of a plurality of computers respectively connected to said coupling facility and a character code of an address expression used to locate text data to be accessed by one of said plurality of computers;

storing, in response to reception of text data from a first computer selected from said plurality of computers, a format of a address expression of the first computer and the text data in a shared file of said coupling facility;

notifying, from said coupling facility, the transmission of text data to computers using the shared file;

comparing, in response to a request from a second computer selected from said plurality of computers notified of the transmission of the text data, a character code of an address expression of text data to be accessed by the second computer with a character code of the address expression used to locate text data kept by the coupling facility in accordance with the correspondence relationship;

converting, when the character codes are different from each other as a result of the comparison, the character code of the address expression of the shared file into data of the character code of the address expression of the second computer and transmitting the text data with the converted character code of the address expression to the second computer; and sending, when the character codes are equal to each other as a result of the comparison, the text data stored in the shared file to the second computer.

* * * * *